United States Patent
Fukumoto

(10) Patent No.: US 8,096,181 B2
(45) Date of Patent: Jan. 17, 2012

(54) INERTIAL SENSOR

(75) Inventor: Koji Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 416 days.

(21) Appl. No.: 12/303,902

(22) PCT Filed: Jun. 6, 2007

(86) PCT No.: PCT/JP2007/061447
§ 371 (c)(1),
(2), (4) Date: Dec. 8, 2008

(87) PCT Pub. No.: WO2007/145113
PCT Pub. Date: Dec. 21, 2007

(65) Prior Publication Data
US 2010/0223996 A1    Sep. 9, 2010

(30) Foreign Application Priority Data
Jun. 16, 2006  (JP) .................................. 2006-167760

(51) Int. Cl.
*G01C 19/56* (2006.01)
(52) U.S. Cl. .................................................. 73/504.12
(58) Field of Classification Search ............... 73/504.12
See application file for complete search history.

(56) References Cited

U.S. PATENT DOCUMENTS

| | | | |
|---|---|---|---|
| 3,747,044 A | 7/1973 | Vaccaro | |
| 5,295,386 A | 3/1994 | Okada | |
| 5,492,020 A | 2/1996 | Okada | |
| 6,308,567 B1 * | 10/2001 | Higuchi et al. | 73/504.12 |
| 6,349,597 B1 * | 2/2002 | Folkmer et al. | 73/504.02 |
| 6,848,304 B2 * | 2/2005 | Geen | 73/504.04 |
| 2006/0112764 A1 * | 6/2006 | Higuchi | 73/504.12 |

FOREIGN PATENT DOCUMENTS

| | | |
|---|---|---|
| JP | 8-504275 | 7/1996 |
| JP | 09-318539 | 12/1997 |
| JP | 10-239347 | 9/1998 |
| JP | 11-183179 | 7/1999 |
| JP | 11-230760 | 8/1999 |
| JP | 11-235917 | 11/1999 |
| JP | 3549590 | 4/2004 |
| JP | 2004-294450 | 10/2004 |
| JP | 2006-017538 | 1/2006 |
| JP | 3585959 | 12/2008 |
| WO | 98/01722 | 1/1998 |
| WO | 2004/097431 | 11/2004 |

OTHER PUBLICATIONS

International Search Report dated Jul. 10, 2007.

* cited by examiner

*Primary Examiner* — Hezron E Williams
*Assistant Examiner* — Mark A Shabman
(74) *Attorney, Agent, or Firm* — SNR Denton US LLP

(57) ABSTRACT

An inertial sensor includes a drive structure 11 which performs one reference oscillation in an XY plane, and force detecting structures 12 (12-1 to 12-4) which each have a plurality of detection axes and which are arranged on an X axis and a Y axis in the drive structure 11 in pairs at positions symmetrical about an origin, wherein angular velocities in three axes and accelerations in three axes are detected by providing the force detecting structure 12 with the plurality of detection axes including at least one detection axis orthogonal to the one reference oscillation.

5 Claims, 8 Drawing Sheets

(1)

(2)  (3)

(1)

(2)

(1)

(2)

(3)

(1)

(2)

(3) (4)

INERTIAL SENSOR

TECHNICAL FIELD

The present invention relates to an inertial sensor for detecting angular velocities in three axes and accelerations in three axes.

BACKGROUND ART

In automotive industry, machine industry and the like, there is an increasing demand for sensors capable of accurate detection of such physical quantities as acceleration and angular velocity. In general, an acceleration in an arbitrary direction and an angular velocity in an arbitrary rotating direction are applied to an object performing a free motion in a three-dimensional space. Therefore, in order to accurately grasp the motion of the object, it is necessary to independently detect the acceleration in each of ordinate axis directions in an XYZ three-dimensional coordinate system and the angular velocity about each of the coordinate axes, respectively. In view of this, there is an increasing demand for a multi-dimensional acceleration sensor and a multi-axial angular velocity sensor which are small in size, are high in accuracy and can be manufactured at reduced costs.

Hitherto, a variety of multi-dimensional acceleration sensors have been proposed. For example, acceleration sensors for detecting an exerted acceleration on the basis of each coordinate axis direction have been disclosed (refer to, for example, Patent Documents 1, 2 and 3). It is a characteristic feature of these acceleration sensors that a plurality of resistance elements, capacitance elements or piezoelectric elements are arranged at predetermined positions on a flexible substrate, and an applied acceleration is detected based on variations in the resistance values of the resistance elements, variations in the capacitance values of the capacitance elements or variations in the generated voltages of the piezoelectric elements. The flexible substrate is fitted with a plumb weight, and, when an acceleration is applied, a force is exerted on the plumb weight, and the flexible substrate is flexed. When this flexure is detected based on the above-mentioned variations in the resistance values, capacitance values or generated electric charges, the acceleration components in the axial directions can be determined.

On the other hand, the multi-axial angular velocity sensor has rarely been described in documents so far or put to practical use. Normally, angular velocity sensors are utilized for detecting the angular velocity of a vehicular power shaft or the like, and only have a function of detecting the angular velocity about a specific, single axis. In the case of determining the rotating speed of such a power shaft, it suffices to use a one-dimensional angular velocity sensor. However, for detecting the angular velocity of an object performing a free motion in a three-dimensional space, it is necessary to independently detect the angular velocities about an X axis, a Y axis, and a Z axis (hereinafter the X axis, the Y axis and the Z axis will be referred to as three axes) in an XYZ three-dimensional coordinate system. In order to detect the angular velocities about the three axes by use of a one-dimensional angular velocity sensor utilized hitherto, it may be necessary to prepare three pairs (sets) of such one-dimensional angular velocity sensors and mount them in such orientations that the angular velocities respectively about the axes can be detected. Therefore, the system as a whole would be complicated in structure, and high in cost.

An angular velocity sensor capable of triaxial detection has been proposed (refer to, for example, Patent Document 4). This sensor is based on a method in which a plumb weight is put into an orbital motion, and angular velocities about three axes are detected in two directions perpendicular to the tangential direction and in the axial direction. This angular velocity sensor has difficulty in dispersion control and electric control of a structure with a degree of freedom of two, for ensuring a stable orbital motion. Specifically, there are technical difficulties in separation of centrifugal forces and in suppression of noises arising from disturbance accelerations, etc., so that it is difficult to obtain an SN comparable to those of angular velocity sensors utilized hitherto.

In addition, sensors for simultaneously detecting accelerations in three axes and angular velocities about the three axes have been proposed (refer to, for example, Patent Documents 5 and 6). In these sensors, displacements in acceleration and angular velocity obtained from a single plumb weight are separated by signal processing. Therefore, it is impossible to obtain a sufficient SN in relation to other-axial sensitivity and disturbance noises, and the applications for which these sensors can be used are limited.

On the other hand, as uniaxial or biaxial angular velocity detectors, methods using the MEMS (Micro Electro Mechanical Systems) technology have been put into practical use. Also, use of two or three such detectors to configure a triaxial system is not impossible. For instance, in configuration examples in which a plurality of triaxial acceleration sensors and a plurality of uniaxial angular velocity sensors are arranged, the system in every one of the examples would be not less than a few $cm^3$ in size for the structural reasons, and there are technical difficulties in simultaneously fabricating a structure for the X- and Y-axis directions and a structure for the Z-axis direction; therefore, these configurations have not yet been realized.

In order to mount an inertial sensor with multi-axial sensitivity on a mobile apparatus such as PDA, a further reduction is required. Therefore, the mounting has not yet been realized by use of inertial sensors with multi-axial sensitivity according to the related art. If an inertial sensor capable of detecting accelerations in three axes and angular velocities in three axes is reduced in size and cost, it is expected to be mounted on mobile apparatuses such as various input apparatuses and PDA.

Patent Document 1: International Publication under PCT WO 88/08522 (US patents (2), U.S. Pat. Nos. 3,747,044, 4,967,605 and 5,182,515)

Patent Document 2: International Publication under PCT WO 91/10118 (U.S. Pat. No. 5,295,386)

Patent Document 3: International Publication under PCT WO 92/17759 (U.S. Pat. No. 5,492,020)

Patent Document 4: Japanese Patent Laid-open No. 2004-294450

Patent Document 5: Japanese Patent No. 3549590

Patent Document 6: Japanese Patent No. 3585959

DISCLOSURE OF INVENTION

Technical Problem

The problems to be solved reside in that a reduction in size of an inertial sensor capable of detecting accelerations in three axes and angular velocities in three axes has not yet been realized, and that it is very difficult to obtain a sufficient SN ratio in relation to other-axial sensitivity and disturbance noises.

The present invention aims at enhancing the SN of, and reducing the size of, an inertial sensor.

Technical Solution

An inertial sensor of the present invention includes: a drive structure operative to perform one reference oscillation in an XY plane; and force detecting structures which each has a plurality of detection axes and which are arranged on an X axis and a Y axis in the drive structure in pairs at positions symmetrical about each origin, wherein angular velocities in three axes and accelerations in three axes are detected by providing the force detecting structure with the plurality of detection axes including at least a detection axis orthogonal to the one reference oscillation.

In the inertial sensor of the present invention, the force detecting structures each having a plurality of detection axes are arranged on the X axis and the Y axis in the drive structure in pairs at positions symmetrical about each origin, and the respective pairs of force detecting structures are oscillated in orthogonal directions. Therefore, the force detecting structures detect forces in a plurality of axes, whereby angular velocity sensors in three axes and accelerations in three axes are detected by a system occupying an area corresponding to two uniaxial angular velocity sensors. In addition, since the force detecting structures in each of the pairs are oscillated in reverse phases, Coriolis forces in opposite senses are exerted on them; therefore, by determining the difference, the angular velocity can be detected with high accuracy. Further, accelerational disturbances are canceled.

Advantageous Effects

According to the inertial sensor of the present invention, angular velocities in three axes and accelerations in three axes can be simultaneously detected with high accuracy by using one force detecting structure having only one reference oscillation. Besides, unrequired disturbance displacements such as centrifugal forces are not mixed into the displacements detected, so that a wide dynamic range of detection can be attained, and SN ratio can be enhanced. Further, since angular velocities in three axes can be detected by use of one drive oscillation, only one set of driving circuit suffices, the circuit can be reduced in size, the areas for pads and wirings can be omitted, and the elements can be reduced in size. Therefore, the inertial sensor is reduced in cost and reduced in size and thickness.

BEST MODE FOR CARRYING OUT THE INVENTION

One embodiment (working example) pertaining to the inertial sensor of the present invention will be described referring to the plan layout view shown in FIG. 1.

Figure 1:
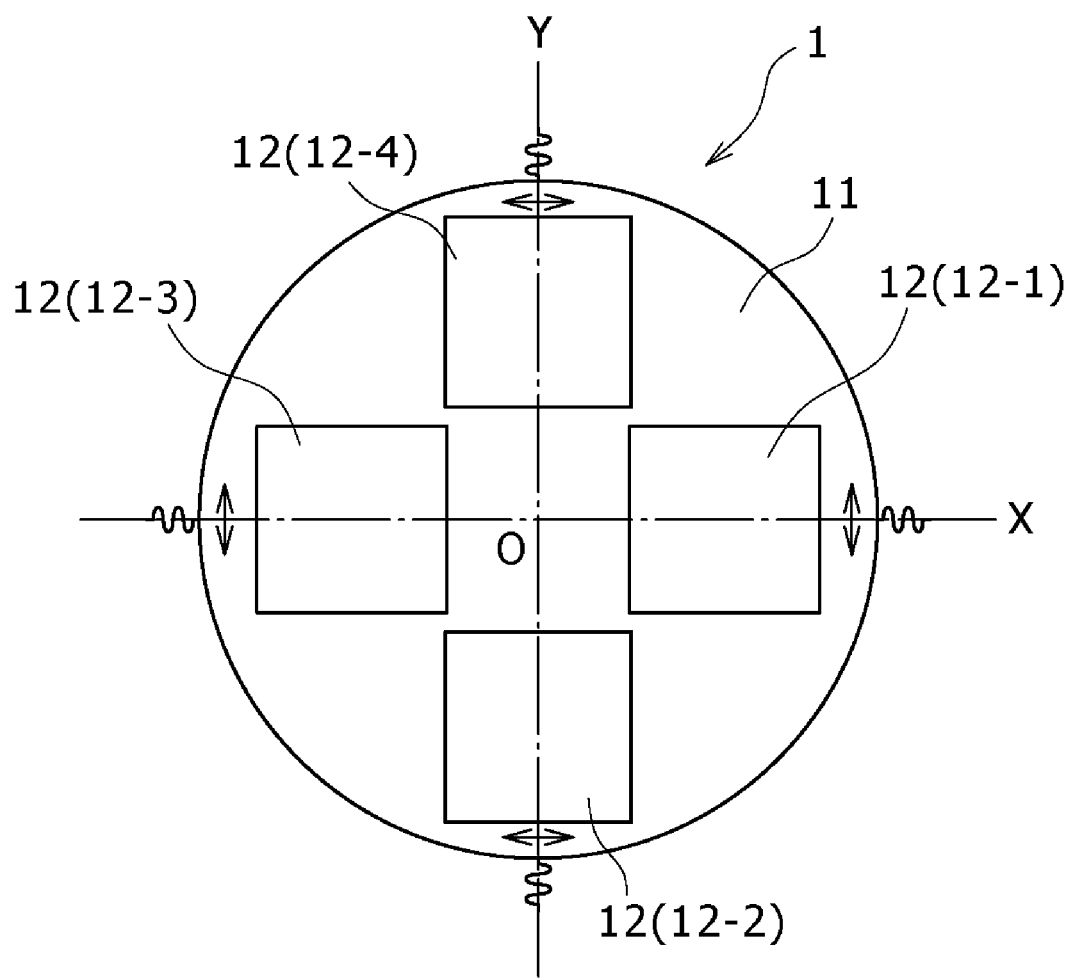
FIG. 1 is a plan layout view showing one embodiment (working example) pertaining to the inertial sensor of the present invention.

As shown in FIG. 1, the inertial sensor 1 has a configuration in which pairs of force detecting structures 12 (12-1 and 12-3, and 12-2 and 12-4) are arranged respectively on an X axis and a Y axis in one drive structure 11 at positions objective about an origin O, and a reference oscillation such as to put the force detecting structures 12 (12-1, 12-3) and the force detecting structures 12 (12-2, 12-4) into oscillation in orthogonal directions on the X axis and the Y axis is given. Examples of such reference oscillation include a rotational oscillation for oscillating the drive structure 1 into a rotating direction, and reverse-phase oscillations along the X axis and the Y axis.

Here, the reverse-phase oscillations along the X axis and the Y axis will be described referring to the plan layout views in FIG. 2.

Figure 2:
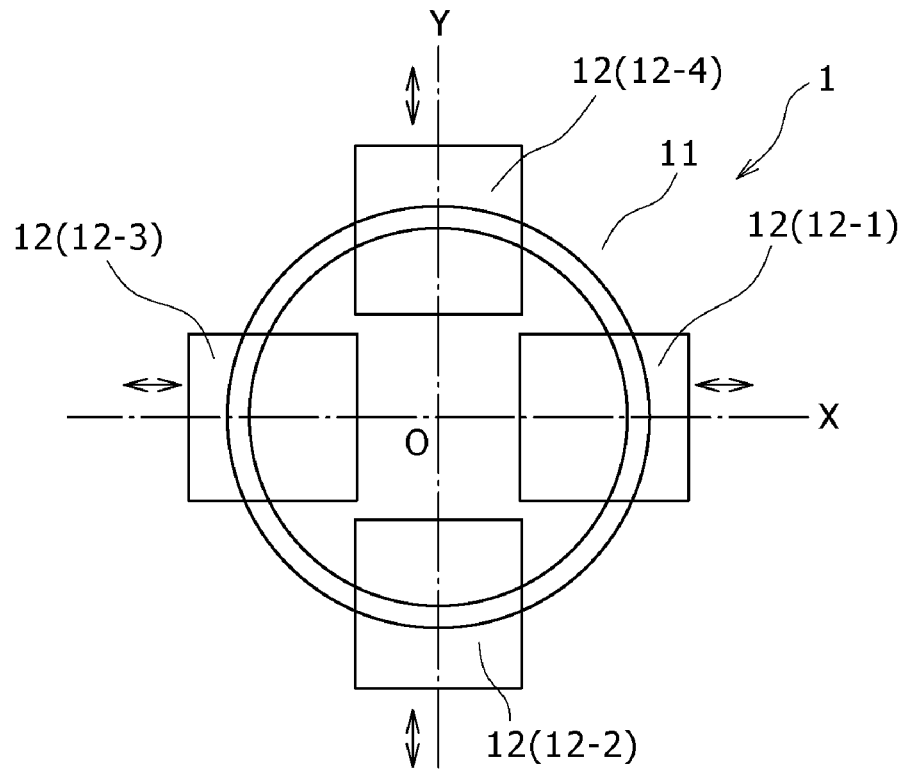
FIG. 2 shows plan layout views illustrating reverse-phase oscillations along an X axis and a Y axis.
Figure 2:
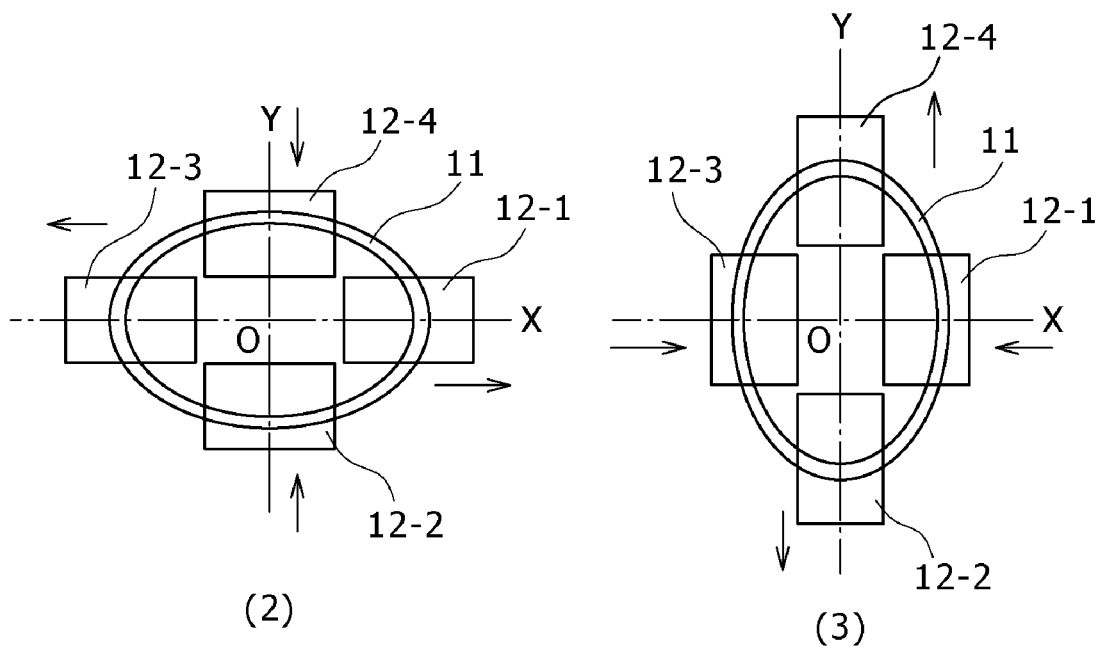

As shown in FIG. 2(1), the inertial sensor 1 has a configuration in which pairs of force detecting structures 12 (12-1 and 12-3, and 12-2 and 12-4) are arranged respectively on the X axis and the Y axis in an annular drive structure 11 at positions objective about an origin O, and a reference oscillation such as to put the force detecting structures 12 (12-1, 12-3) and the force detecting structures 12 (12-2, 12-4) into oscillations in orthogonal directions on the X axis and the Y axis is given.

The force detecting structures 12 arranged on the drive structure 11 have a plurality of detection axes, one of which is in a direction perpendicular to the reference oscillation.

Now, let assume that, as shown in FIG. 2(2), the force detecting structures 12-1 and 12-3 on the X axis in the drive structure 11 are oscillated in the senses of moving away from the origin O, then the force detecting structures 12-2 and 12-4 on the Y axis are oscillated in the senses of approaching the origin O. In addition, when the force detecting structures 12-1 and 12-3 on the X axis are oscillated in the senses of approaching the origin O as shown in FIG. 2(3), the force detecting structures 12-2 and 12-4 on the Y axis are oscillated in the senses of moving away from the origin O. This can be realized by optimizing the resonance mode of the drive structure 11.

Means for applying a driving force include such means as an electrostatic force, a piezoelectric element, and an electromagnetic force. Of these means, those which can be comparatively easily formed by a semiconductor manufacturing process include detection means using an electrostatic force. The drive structure 11 can be oscillated by a system in which parallel flat plate electrodes are formed at an interval of a few micrometers to several tens of micrometers in the direction in which driving is desired to occur, and a voltage at a frequency for oscillating the above-mentioned resonance mode is impressed between the electrodes and the drive structure 11. In order to secure a sufficient driving force, a comb-toothed electrode may be used in place of the parallel flat plate electrodes.

Thus, in the inertial sensor 1 pertaining to the present invention, the reference oscillations in two axial directions necessary for detection of angular velocities in three axial directions are realized by a system in which a plurality of the force detecting structures 12 are appropriately arranged on one drive structure 11, and the drive structure 11 is put into rotational oscillation or reverse-phase oscillations in the X-axis direction and the Y-axis direction. In this inertial sensor 1, there are merits that one set of driving circuit suffices although three or two sets of driving circuits seem intrinsically needed, and that reductions in the number of circuits and the number of mechanisms and steps for control of a driving frequency can be achieved. In addition, there is the merit that it is possible to obviate the bad influence usually the case with a drive structure having a multi-axial drive oscillation mechanism, i.e., the problem in which one drive oscillation leaks to the other-axis parts, thereby serving as mechanical noises.

Figure 3:
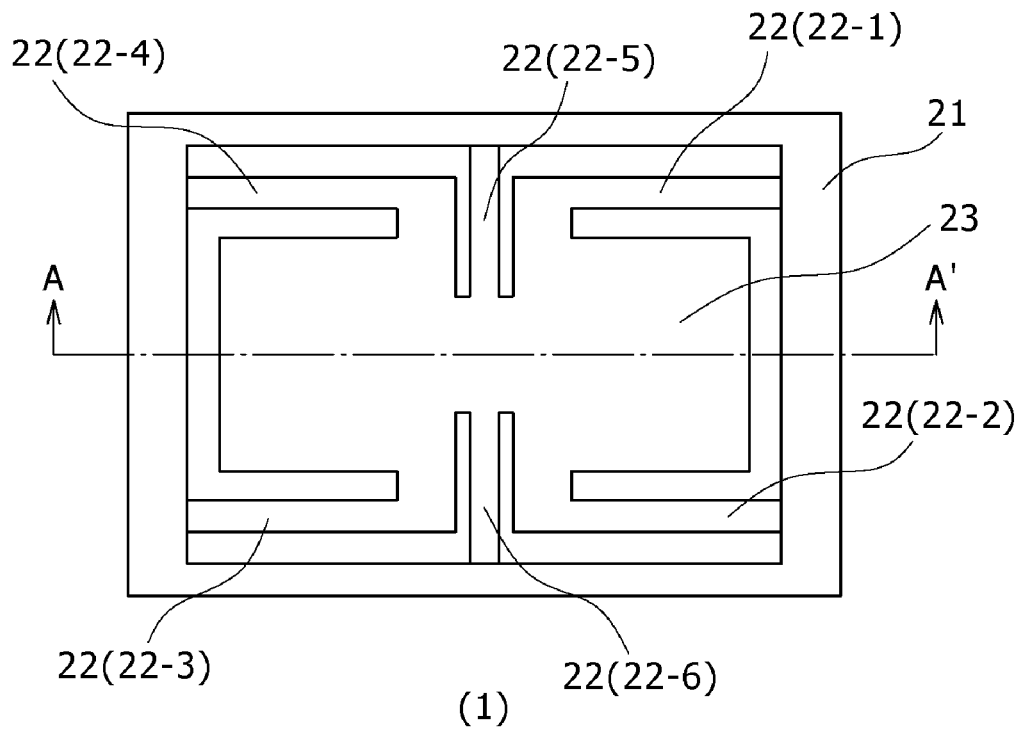
FIG. 3 shows a plan layout view illustrating the above-mentioned force detecting structure, and a sectional view taken along line A-A' of the plan layout view.
Figure 3:
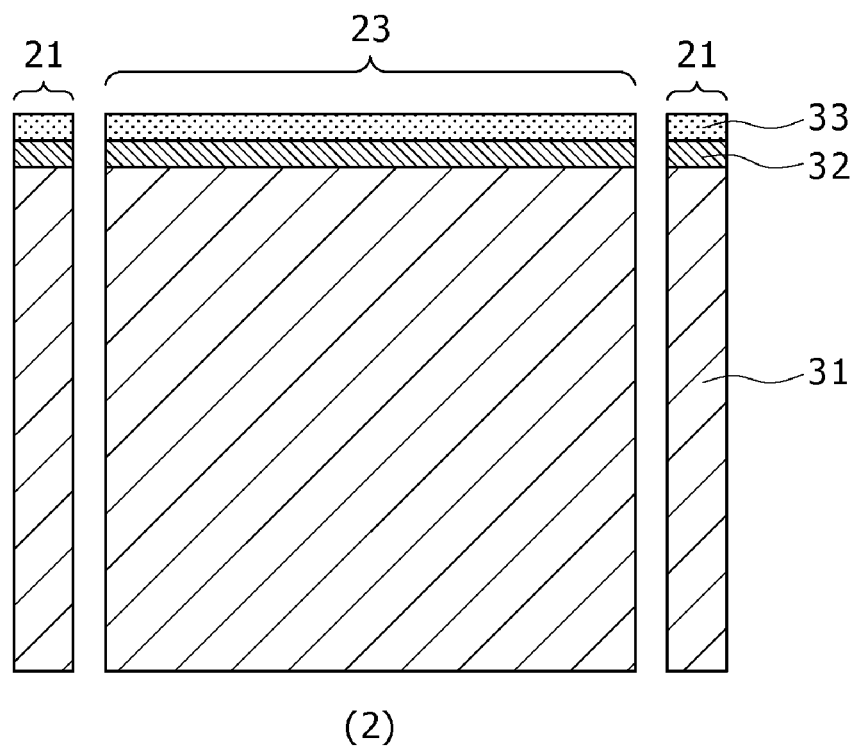

Now, the force detecting structure 12 will be described below referring to FIG. 3. FIG. 3 shows a plan layout view in (1), and shows in (2) a sectional view taken along line A-A' of the plan layout view (1).

As shown in FIG. 3, the force detecting structure 12 includes: elastic supports 22 (22-1 to 22-6) supported on a support part 21 on one-end sides thereof; an oscillator 23 supported on the other-end sides of the elastic supports 22; and a displacement detecting part (not shown) for detecting the displacement of the oscillator 23 and outputting a signal. The support part 21, the elastic supports 22 and the oscillator 23 are formed by use of an SOI substrate, for example. For example, the SOI substrate has a base silicon layer 31, an insulating layer (for example, BOX layer) 32, and a silicon active layer 33 laminated in this order from the lower side. The support part 21 and the oscillator 23 are each formed of three layers of the base silicon layer 31, the insulating layer 32, and the silicon active layer 33, whereas the elastic supports 22 are each formed of the silicon active layer 33. Therefore, the oscillator 23 is supported in the manner of being suspended from the elastic supports 22 of the silicon active layer 33. Accordingly, the oscillator 23 has degrees of freedom in the directions parallel to the X axis, the Y axis and the Z axis, and in the rotating directions about these axes.

In the force detecting structure 12, when a force in the X-axis direction is exerted, the oscillator 23 is inclined, and the force exerted can be detected by detecting the inclination. In the case where a force in the Y-axis direction is exerted, also, the force detected can be detected in the same manner as in the case of the force in the X-axis direction. Besides, where a force in the Z-axis direction is exerted, the oscillator 23 is displaced in the Z-axis direction, and the force exerted can be detected by detecting the displacement amount. Examples of the methods for detecting the inclinations in the X-axis direction and the Y-axis direction and the displacement in the Z-axis direction include methods using electrostatic detection, piezo detection, piezoelectric detection or magnetic detection, and various methods of detecting a displacement can be used. Here, the cases of electrostatic detection and piezo detection which can be comparatively easily formed by ion implantation technique or the like in a semiconductor process will be shown as examples.

Now, a configuration example in the case of using capacitance detection will be described below referring to FIG. 4.

Figure 4:
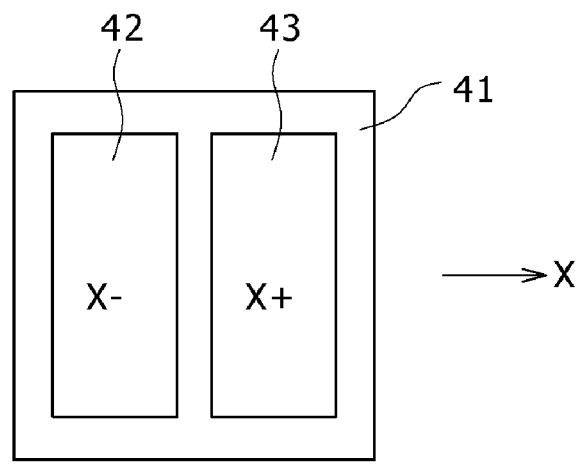
FIG. 4 shows drawings illustrating one example of an inertial sensor using capacitance detection.
Figure 4:
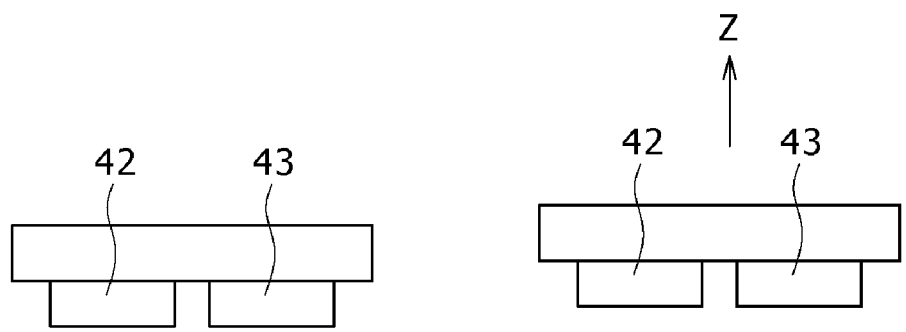
Figure 4:
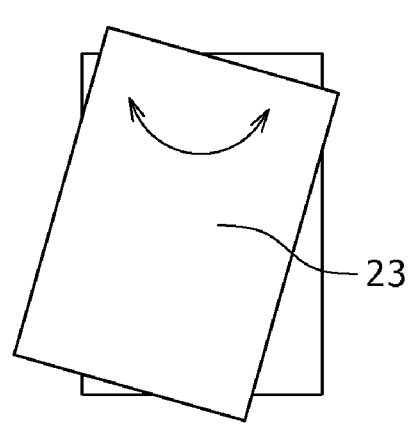
Figure 4:
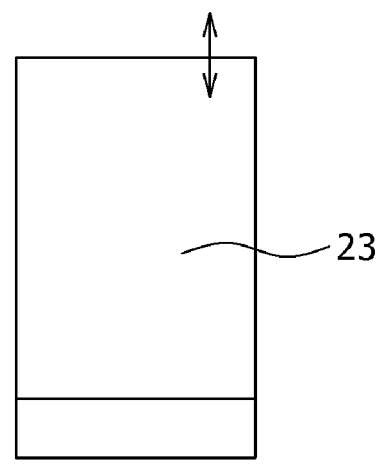

As shown in FIG. 4(1), a detection substrate 41 arranged at an upper part of the oscillator 23 [see FIG. 3] is provided, for example, with two detection electrodes 42 and 43 at the surfaces of the detection substrate 41 which face the oscillator 23. As shown in FIG. 4(2), an inclination in the X-axis direction can be detected by detecting the difference between the capacitances between the detection electrodes 42, 43 and the oscillator 23. As shown in FIG. 4(3), a displacement in the Z-axis direction can be detected by detecting the sum of the capacitances between the detection electrodes 42, 43 and the oscillator 23.

Figure 5:
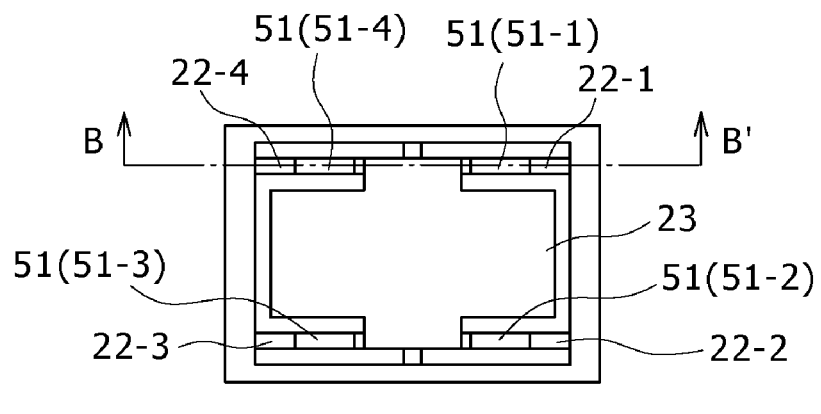
FIG. 5 shows drawings illustrating one example of an inertial sensor using piezo detection.
Figure 5:
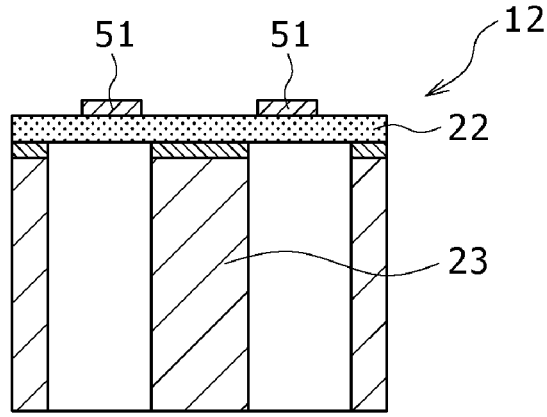
Figure 5:
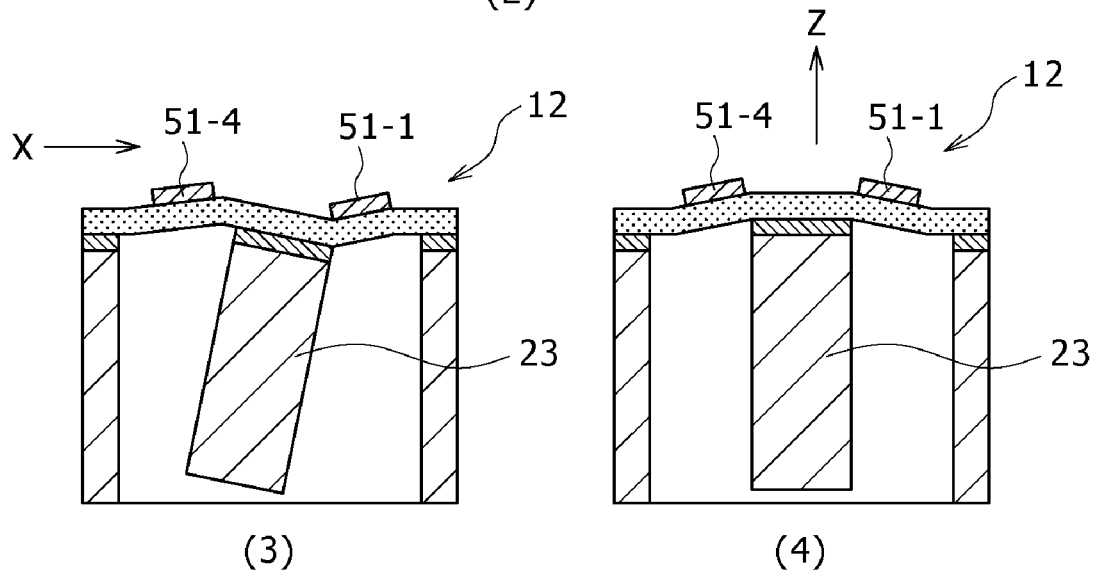

Now, one example of the inertial sensor 1 using piezo detection will be described below referring to FIG. 5. FIG. 5(2) is a sectional view taken along line B-B' of FIG. 5(1), and FIGS. 5(3) and (4) are drawings for illustrating displacements in the sectional view taken along line B-B' of FIG. 5(1).

As shown in FIG. 5(1), elastic supports 22-1 to 22-4 supporting an oscillator 23 are provided with piezo elements 51 (51-1 to 51-4), respectively. By detecting variations in the resistances of the piezo elements 51 (51-1 to 51-4), bending due to inclination or displacement can be detected.

As shown in FIG. 5(2), a force detecting structure 12 is in an initial state. In other words, the elastic supports 22 are in a steady state, and the oscillator 23 is not inclined. Therefore, no variation is generated in the resistances of the piezo elements 51.

In this case, when for example a force in the X-axis direction is exerted on the force detecting structure 12, the oscillator 23 exhibits an oscillation such as to be inclined in the X-axis direction, as shown in FIG. 5(3). In this instance, a stress in a compressive direction (or an extensive direction) is exerted on one 51-1 of the piezo elements arranged in the X-axis direction, while a stress in the tensile direction (or compressive direction) reverse to that on the piezo element 51-1 is exerted on the other piezo element 51-4. By detecting the tensile stress and the compressive stress, the inclination in the X-axis direction can be detected.

In addition, when for example a force in the Z-axis direction is exerted on the force detecting structure 12, the oscillator 23 is displaced in the Z-axis direction, as shown in FIG. 5(4). In this case, a stress in an extensive direction or a stress in a compressive direction is exerted on the piezo elements 51-1, 51-4 arranged in the X-axis direction or the Y-axis direction. By detecting the tensile stress or the compressive stress, the displacement in the Z-axis direction can be detected.

Here, the principle of detection of angular velocity will be described. When a rotating motion at an angular velocity A is effected in a direction perpendicular to the Z axis, for example, in the X axis in the condition where an oscillator having a certain mass is in such an oscillation as to perform a reciprocating motion in the Z-axis direction, a Coriolis force F is generated in the Y-axis direction. When a rotating motion at an angular velocity ω is effected in the Y axis, also, a Coriolis force F is generated in the X-axis direction. This phenomenon is a dynamic phenomenon long known as the Foucault's pendulum, and the Coriolis force F generated here is represented by $F=2$ m·v·ω, where m is the mass of the oscillator, v is the instantaneous velocity as to the motion of the oscillator, and ω is the instantaneous angular velocity of the oscillator. Since the Coriolis force is generated in the direction perpendicular to the oscillation, the Coriolis force is not generated in the oscillation direction, in principle. Therefore, in the oscillation type angular velocity detector according to the related art, angular velocities in two axes at maximum can only be detected with uniaxial oscillation, or, alternatively, detection in three axial directions has been enabled by effecting a two-dimensional elliptic motion (equivalent to simultaneous oscillations in two axes).

The principles of detection of angular velocity and acceleration in the inertial sensor 1 pertaining to the present invention will be described below.

The plurality of force detecting oscillators 12 arranged on the one drive structure 11 given the reference oscillation as above-mentioned make it possible to detect angular velocities in three axes and accelerations in three axes.

When at least two drive detecting structures 12 are present, angular velocities in three axes and accelerations in three axes can be detected. Here, as a configuration example capable of detecting angular velocities and accelerations with high accuracy by canceling disturbances, an example in which four force detecting structures 12 (12-1 to 12-4) are arranged on an X axis and a Y axis at points symmetrical about an origin will be described.

First, an example in which force detecting structures 12 driven in a reverse-phase mode and using capacitance detection are used will be described referring to the plan layout view shown in FIG. 6.

Figure 6:
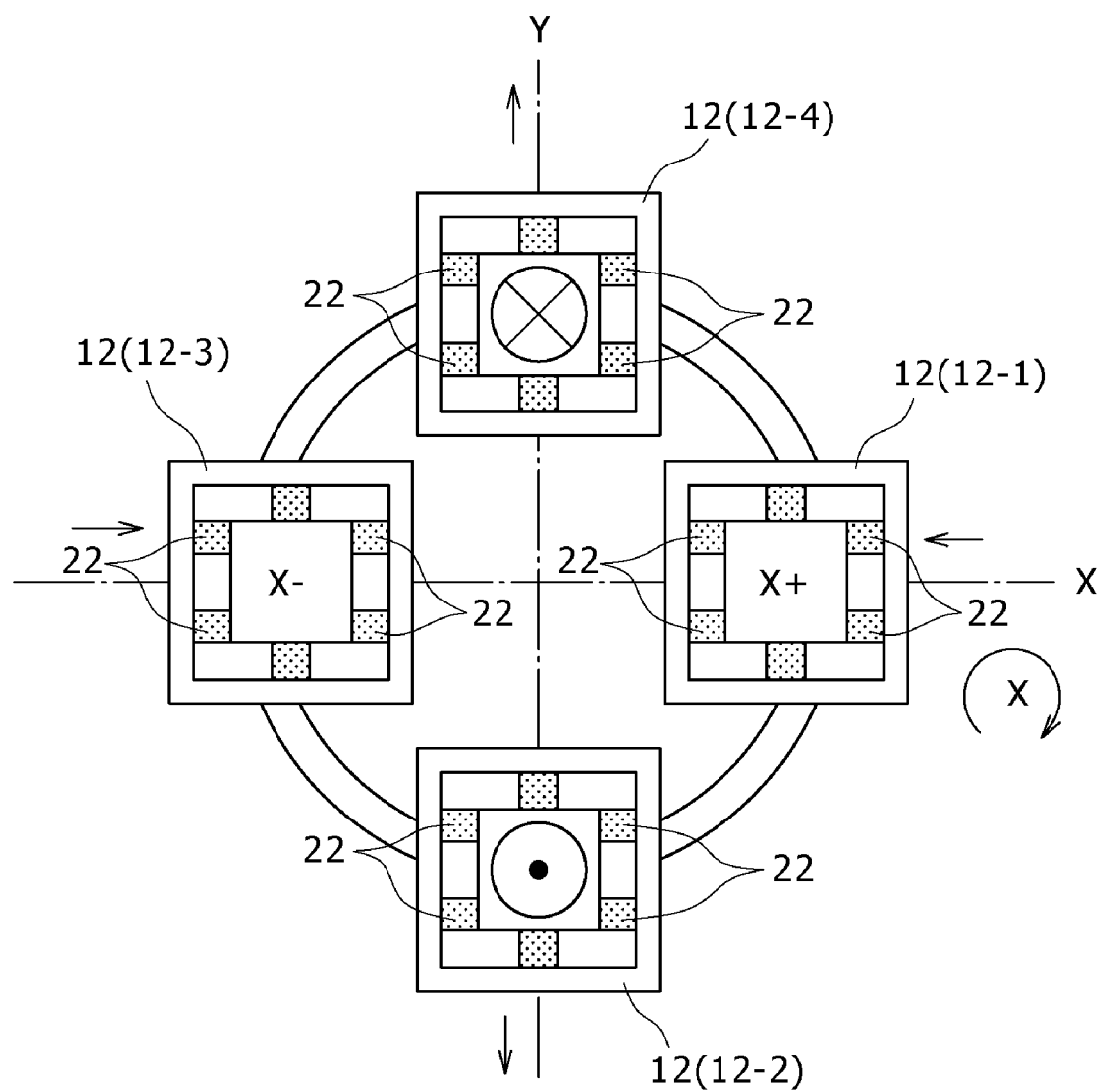
FIG. 6 is a plan layout view of an inertial sensor, showing the case of driving in a reverse phase mode.

As shown in FIG. 6, while the force detecting structures 12 are each capable of detection in a plurality of axes, here, the detection axes are set for parallel translation along the Z axis and in directions in the XY plane which are orthogonal to the axis (in the X axis or the Y axis), for suppressing unnecessary mechanical oscillations and for achieving accurate detection. The resonance frequency in regard of the detection axes is set to within ±20% of the oscillation frequency. For attaining a high gain, a value of about ±5% is desirable. The structure of the elastic supports 22 [see FIG. 3] is so set that the resonance frequencies in regard of the other axes are not less than ±20% of the oscillation frequency, so as to suppress unnecessary mechanical noises. This is made by setting the spring constant of the elastic supports 22. For example, the spring constant can be controlled by regulating the thickness, width, length, and shape of the elastic supports 22. Or, alternatively, this control can be made also by changing the material.

Now, an example of electrodes arranged at an upper part of the oscillator 23 for the purpose of capacitance detection will be described below referring to the plan layout view in FIG. 7.

Figure 7:
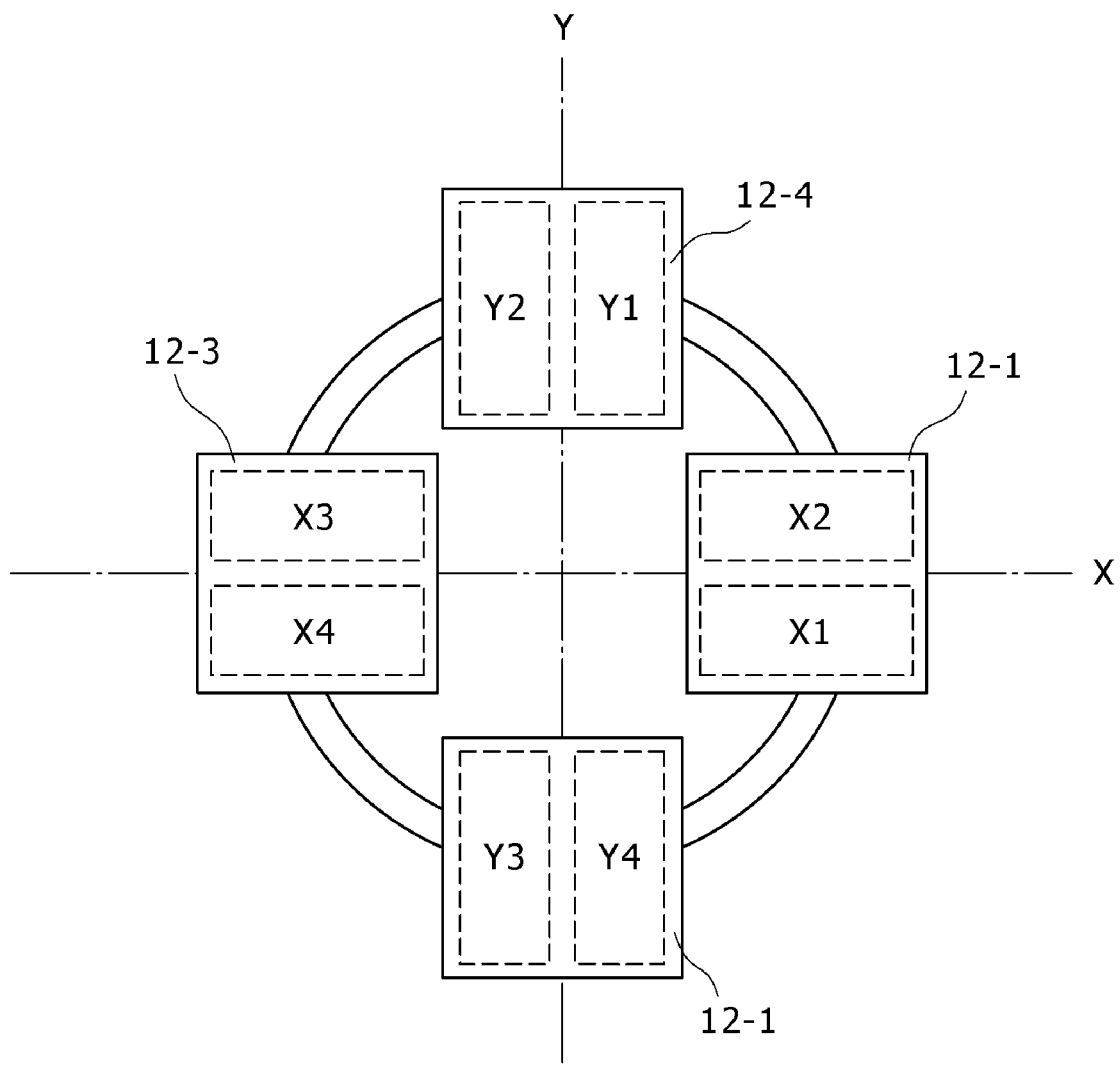
FIG. 7 is a plan layout view showing an example of arrangement of electrodes for capacitance detection.

As shown in FIG. 7, detection electrodes 42 and 43 are arranged on a surface, on the side of facing the oscillator (not shown), of a detection substrate 41 arranged at an upper part of the oscillator. While arranged only at an upper part of the oscillator in this example, the detection electrodes may naturally be disposed at a lower part of the oscillator or on both sides of the oscillator.

As shown in FIG. 6 above, when the force detecting structures 12-1 and 12-3 on the X axis are moved toward the origin O, the force detecting structures 12-2 and 12-4 on the Y axis are moved away from the origin O. In this instance, if an angular velocity Q about the X axis is exerted, a Coriolis force Fc=2 mAωΩ in the Z direction is exerted on the two force detecting structures 12-2 and 12-4 on the Y axis, where A is the maximum amplitude of the reference oscillation, ω is the frequency of the reference oscillation, m is the mass of the dead-weight body in the force detecting structure. Since the two force detecting structures 12-2 and 12-4 on the Y axis are oscillating in reverse senses (reverse phase) in relation to the angular velocity about the X axis, the senses of the Coriolis forces are in opposite senses in the Z-axis direction. The angular velocity about the X axis can be detected by determining the difference between the two force detecting structures 12-2 and 12-4, namely, (Y1+Y2)−(Y3+Y4) shown in FIG. 7, where Y1 to Y4 are detected capacitances of the electrodes.

An angular velocity about the Y axis can also be detected in the same manner, by detecting the displacements in the Z-axis direction of the two force detecting structures 12-1 and 12-3 on the X axis. Namely, the angular velocity about the X axis can be detected by determining (X1+X2)−(X3+X4) shown in FIG. 7, where X1 to X4 are detected capacitances of the electrodes.

Now, the case where an angular velocity about the Z axis is applied will be described below referring to the plan layout view in FIG. 8.

Figure 8:
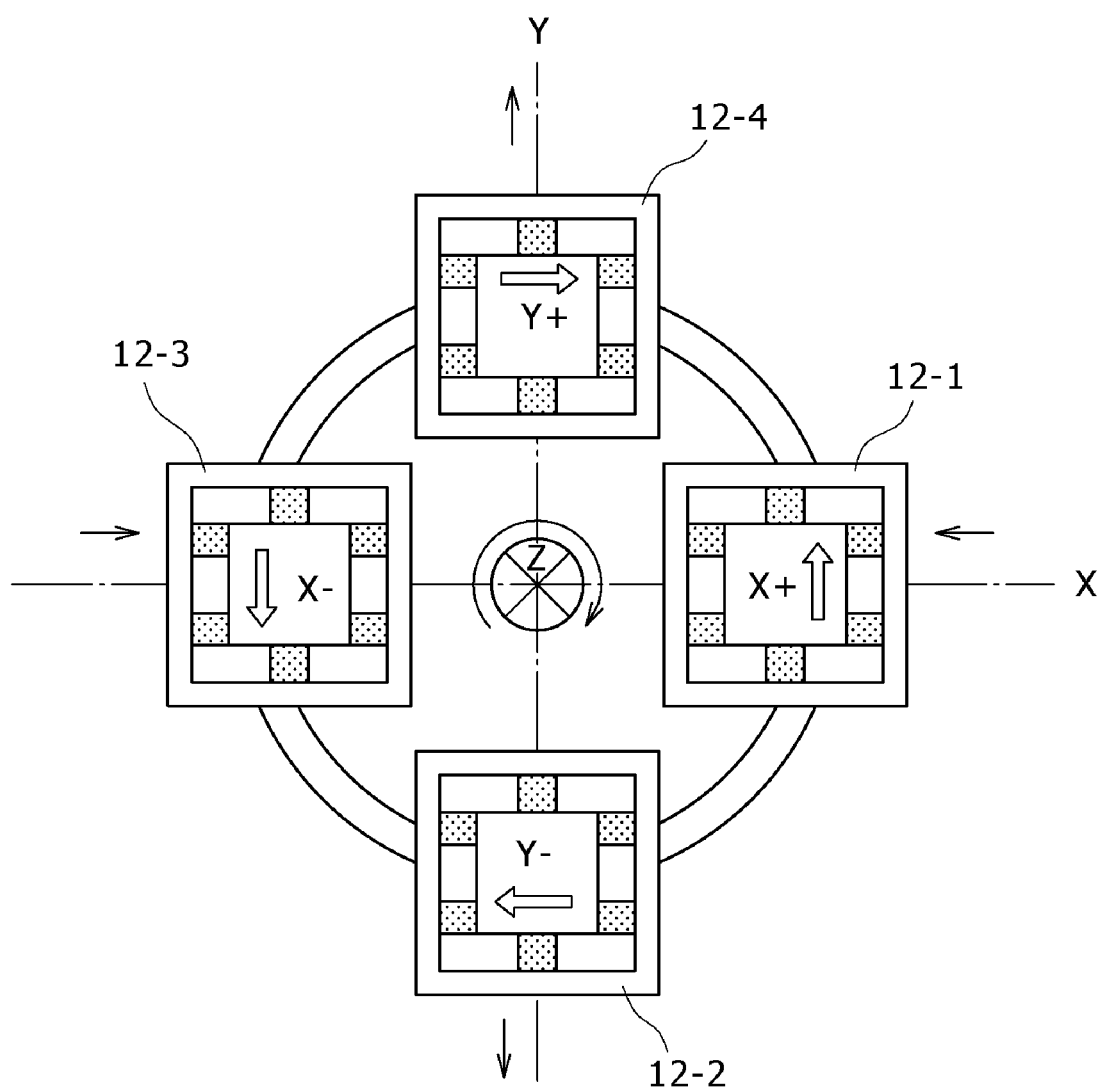
FIG. 8 is a plan layout view of an inertial sensor, showing the case where an angular velocity about a Z axis is applied.

As shown in FIG. 8, the oscillators 23 [see FIG. 3 above] of the force detecting structures 12-1 to 12-4 respectively receive Coriolis forces in directions going straight to the Z axis, and the force detecting structures 12-1 to 12-4 are inclined in the directions orthogonal to the Z axis (for example, in the directions of arrows). In regard of the displacements due to the inclinations on the X axis and on the Y axis, those of the two force detecting structures 12-1 and 12-3 are in opposite senses, and those of the force detecting structures 12-2 and 12-4 are in opposite senses. Therefore, by detecting the differences between the displacements, the angular velocity about the Z axis can be detected. It suffices to determine the differences between the displacements of at least two force detecting structures in reverse phases, of the displacements of the four force detecting structures 12-1 to 12-4. It can be detected also by use of all the displacements of the four force detecting structures. For example, in the case of the electrode configuration shown in FIG. 7 above, the difference is $\{(Y2-Y1)-(Y3-Y4)\}+\{(X1-X2)-(X4-X3)\}$, where X1 to X4 and Y1 to Y4 are the detected capacitances of the electrodes.

In addition, where an acceleration in the X-axis direction is applied, the two force detecting structures 12-2 and 12-4 on the Y axis are inclined in the X-axis direction. In this case, the two force detecting structures 12-2 and 12-4 on the Y axis are inclined in the same sense, and, therefore, the sum of their values directly gives the acceleration.

In the case where an acceleration in the Y-axis direction is applied, also, the acceleration as component in the Y-axis direction can be detected by determining the sum as to the two force detecting structures 12-1 and 12-3 on the X axis, in the same manner as in the case for the X axis.

In the case where an acceleration in the Z-axis direction is applied, all the four force detecting structures 12-1 to 12-4 are put into parallel translation in the same direction. Therefore, the acceleration in the Z-axis direction can be detected by monitoring the total capacitance change (X1+X2+X3+X4+Y1+Y2+Y3+Y4), or the capacitance change of at least one of the force detecting structures, for example, the capacitance change (X1+X2, or the like) of the force detecting structure 12-1.

Thus, in the inertial sensor 1 pertaining to the present invention, accelerations and angular velocities can be detected by arithmetically processing the data on the oscillators paired. In addition, as practiced hitherto, the angular velocity outputs are synchronous with the reference oscillation, the acceleration signals are independent, and the frequency of detection is generally not more than 200 Hz. Therefore, SN ratio can also be enhanced by dividing the obtained signals into those of not more than 200 Hz and those of not less than 200 Hz, before the arithmetic processing.

With the force detecting structures 12 driven in reverse phases, the accelerational disturbances can be canceled, and angular velocities can be detected with high accuracy. Besides, in the case of the reverse-phase mode, unnecessary disturbance displacements such as centrifugal forces do not mix into the displacements detected, so that it is possible to realize an angular velocity and acceleration sensor which can have a widened dynamic range of detection and which is high in accuracy. In addition, in the case of rotational driving, the driving can be easily realized, the reverse phases can be realized without any phase lag of the force detecting structures 22, and angular velocities can be detected with high accuracy. Further, notwithstanding one force detecting structure 22 is used for detection in a plurality of axes, high-accuracy detection can be achieved with little interference between the axes. Thus, since angular velocities in three axes can be detected with one drive oscillation, one set of driving circuit suffices, the circuit can be reduced in size, the areas for pads and wirings can be omitted, and the elements can be reduced in size. Consequently, the inertial sensor is reduced in cost and is reduced in size and thickness.

The inertial sensor 1 as above-described is applicable to control of robot mechanisms, to input interfaces, to correction of hand movement-induced blurring and prevention of dropping of camera in using a video camera or still camera, and so on.

The invention claimed is:

1. An inertial sensor comprising:
   a drive structure operative to perform one reference oscillation in an XY plane, the XY plane being defined by an X axis and a Y axis; and
   force detecting structures arranged on the X axis and the Y axis in pairs and at positions symmetrical about an origin of the XY plane, each of said force detecting structures including (a) elastic supports, (b) an oscillator on one side of the elastic supports, and (c) piezo elements on an opposite side of the elastic supports,
   wherein,
       a Z axis is orthogonal to both the X axis and the Y axis,
       each of said oscillators is supported in a manner of being suspended from the respective elastic supports such that each oscillator is provided with degrees of freedom in directions parallel to the X axis, the Y axis, and the Z axis, and in rotating directions about each of the X, Y, and Z axes, and
       said inertial sensor is effective to detect angular velocities along three axes and accelerations along three axes in accordance with said one reference oscillation.

2. The inertial sensor as set forth in claim 1, wherein
   when said force detecting structures on said X axis oscillate in the sense of moving away from said origin, said force detecting structures on said Y axis oscillate in the sense of approaching said origin; and
   when said force detecting structures on said X axis oscillate in the sense of approaching from said origin, said force detecting structures on said Y axis oscillate in the sense of moving away from said origin.

3. The inertial sensor as set forth in claim 1, wherein said drive structure performs simple harmonic oscillation in rotating directions about said origin of said X axis and said Y axis.

4. The inertial sensor as set forth in claim 1, wherein the driving system of said force detecting structures is electrostatic driving, piezoelectric driving or electromagnetic driving.

5. The inertial sensor as set forth in claim 1, wherein the force detection by said force detecting structures is electrostatic detection, piezoelectric detection, piezo detection or electromagnetic detection.

* * * * *